May 15, 1951            A. FOSTER            2,553,408
APPARATUS FOR GREASING BAKING TINS AND LIKE UTENSILS
Filed Nov. 9, 1948            2 Sheets-Sheet 2
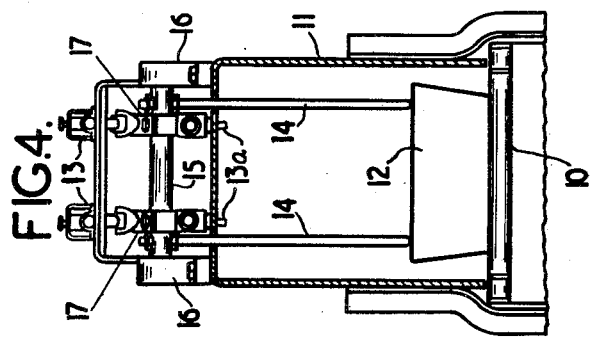
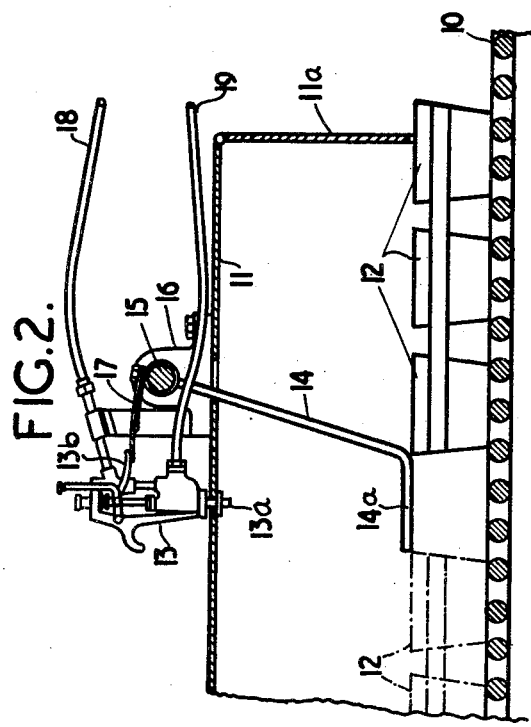
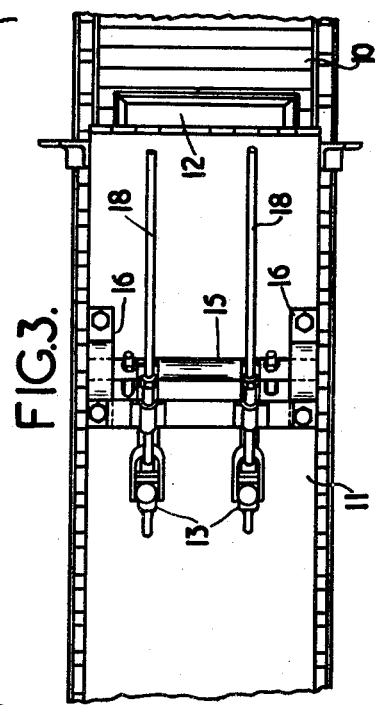
INVENTOR
Arthur Foster Patented May 15, 1951

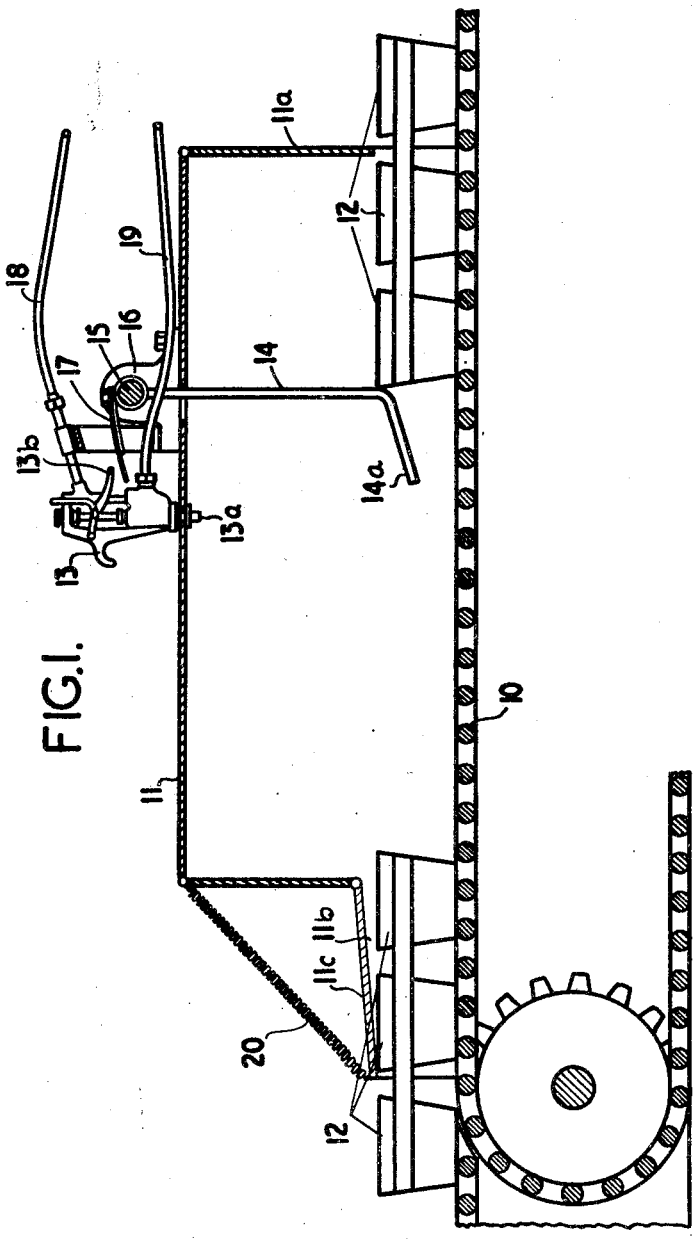

2,553,408

UNITED STATES PATENT OFFICE 2,553,408

APPARATUS FOR GREASING BAKING TINS AND LIKE UTENSILS

Arthur Foster, Birmingham, England, assignor to S. Bradford and Sons Limited, Hockley, Birmingham, England, a corporation of Great Britain Application November 9, 1948, Serial No. 59,156
In Great Britain February 28, 1948

1 Claim. (Cl. 91—45)

This invention has reference to new or improved apparatus for greasing baking tins and like utensils or batches of dough or paste preparatory to baking and is concerned more particularly but not exclusively with apparatus for greasing the baking tins in mechanised bakeries.

According to the invention the new or improved apparatus for greasing baking tins and like utensils or batches of dough or paste preparatory to baking and which incorporates a conveyor for the articles to be greased, comprises in combination, a tunnel enclosure for a part of the conveyor, multiple pneumatically operated spraying nozzles inclined so as to give divergent sprays with only the said nozzles depending within the upper part of the enclosure, said nozzles being adapted to spray hot atomized fat into the tins passing in the enclosure.

Preferably and as herein shown, the apparatus also includes a rock-shaft, feeler means attached to said rock-shaft and adapted to depend within the interior of the tunnel enclosure with a portion located in the path of the tins as they pass into the tunnel enclosure and approach and recede from the spraying position, means operable by the rock-shaft for controlling the spraying nozzles so that spraying is caused to take place whenever and so long as a tin is in contact with the feeler means and is caused to be discontinued whenever the feeler means is out of contact with the tin.

The apparatus also includes a displaceable closure for the approach end of the tunnel and another closure at the exit end of the tunnel which is adapted to assume a substantially horizontal position as the tins pass through a portion of reduced height so as to cover the said tins and ride thereover thereby serving to minimize the escape of fat vapour into the atmosphere as the tins leave the tunnel enclosure.

The invention also resides in automatic apparatus for greasing baking tins or like utensils or batches of dough or paste constructed, arranged and adapted for use substantially as will be described hereinafter.

An embodiment of the invention will now be described with particular reference to the accompanying drawings which illustrate the invention somewhat diagrammatically as applied to the greasing of the baking tins in a mechanised bread making plant in which the baking tins are fed to the filling position on a power driven chain conveyor.

In the drawings—

Figure 1 is a longitudinal vertical section of the improved greasing apparatus and sufficient of the bread making plant as is necessary to an understanding of the invention, showing the movable parts of the greasing apparatus in the positions assumed when either no baking tins are passing to the greasing station or when such tins are about to approach the greasing station.

Figure 2 is a fragmentary view also in longitudinal vertical section and generally similar to part of Figure 1 but showing the positions assumed by the movable parts of the greasing apparatus as the baking tins are passing to and leaving the greasing station.

Figure 3 is a plan of Figure 2 and

Figure 4 is a transverse sectional view taken on the plane indicated by the line 4—4 in Figure 2 looking in the direction of the arrows to said line.

In the drawings like numerals of reference indicate similar parts in the several views.

According to the said illustrated embodiment of the invention a part of the chain conveyor 10 adjacent to the station where the tins are filled with batches of dough is enclosed by a sheet metal housing 11 which constitutes a short tunnel through which the baking tins 12, arranged the usual interconnected "gangs" of three, must pass on their way to the dough filling position aforesaid.

Attached to the roof of the housing 11 substantially midway in the length thereof are two transversely arranged pneumatically operated spraying guns 13 of known kind the nozzle ends 13a of which depend within the housing 11. The spraying guns 13 are arranged so that they incline slightly outwardly so as to give divergent sprays.

The triggers 13b of the spraying guns 13 and the compressed air inlets and the fat inlets are located above the roof of the housing 11.

Adapted to depend within the housing 11 but in advance of the spraying nozzles 13a that is on the inlet side of the housing 11 is a pair of feeler devices in the form of rods 14 having short cranked ends 14a of about 5" in length which are presented in the direction of travel taken by the tins 12 and which are disposed above the level of the chain conveyor 10 at a height slightly less than the depth of the baking tins 12, said cranked ends 14a also being spaced apart at a distance less than the length of the baking tins 12.

The feeler rods 14 aforesaid which tend to hang vertically under the action of gravity are attached at their upper ends to a rock shaft 15 which is transversely mounted in bearings 16 supported on the top of the housing 11. This rock shaft 15 has secured to the intermediate portion thereof the rear ends of a pair of blade springs 17 the free ends of which are operatively associated with the triggers 13b of the spraying guns 13.

The compressed air is led to the upper ends of the spraying guns 13 by means of flexible pipe lines 18 whilst liquid fat is fed to the barrels of the spraying guns 13 by flexible pipe lines 19.

The inlet end of the housing 11 is provided with a closure flap 11a of blanket cloth whilst at the outlet end the housing is provided with a portion 11b of reduced depth which is located forward of the spraying guns 13 and the top of which is closed by a lid 11c which is hinged at its inner end to the housing 11 and which cooperates with spring means indicated diagrammatically in Figure 1 as a coil spring 20 which is anchored at one end to the housing 11 and at the other end to the lid 11c, said spring means 20 serving to counterbalance a substantial part of the weight of the lid 11c so that the lid 11c may ride lightly on top of the tins 12 as they leave the spraying position.

The operation of the invention is as follows:

As the tins travel along the chain conveyor 10 to the dough filling position they enter the housing 11 through the cloth closed inlet end and as they progress through the housing 11 the leading end of the foremost tin 12 bears against the cranked ends 14a of the feeler rods 14 and carries the said ends 14a forwardly whilst riding thereunder whereby the rock shaft 15 is turned and through the blade springs 17 caused to actuate the triggers 13b of the spraying guns 13 which spray the liquid fat downwardly.

Spraying continues as long as tins 12 are passing below the cranked ends 14a of the feeler rods 14 but as soon as a line of tins 12 ends the feeler rods 14 assume the vertical position, seen in Figure 1, with a consequential turning of the rock shaft 15 which removes the springs 17 out of contact with the triggers 13b of the spraying guns 13 thus allowing the said triggers 13b to move to the "cut off" position.

It will be appreciated that by reason of the location of the feeler rods 14 in front of the spraying guns 13 and by reason of the length of the cranked ends 14a of the feeler rods 14 spraying commences some 2½" before the leading tin 12 reaches the spraying position, see Figure 2, and continues until the last tin 12 has travelled some 2½" beyond the spraying position, thus ensuring that every tin 12 is subjected to spraying as it passes through the housing 11.

It will be appreciated also that the slightly divergent setting of the spraying guns 13 ensures that the end portions of the tins 12 are sprayed.

Further it will be appreciated that the cloth closure 11a at the entry end of the housing 11 and the hinged lid 11c at the exit end thereof serve to maintain the fat vapour within the housing 11.

Moreover it will be appreciated that as the spraying is automatically controlled no operatives are required and that the method of greasing by pneumatic spraying devices results in an economy in fat consumption.

Although the invention has been described as applied to the greasing of baking tins for bread it will be appreciated that the invention may be applied to the greasing of other containers of a character analogous to bread tins and to the greasing of batches of dough or paste preparatory to baking.

Having thus disclosed my invention and described in detail an illustrative embodiment thereof, I claim as new and desire to secure by Letters Patent:

Greasing apparatus for bakery plant incorporating a conveyor for the articles to be greased, comprising in combination a tunnel enclosure for a part of the conveyor, multiple pneumatically operated spraying means embodying nozzles disposed at an inclination so as to give divergent sprays with only the said nozzles depending within the upper part of the enclosure, said spraying means being adapted to spray atomised fat into the interior of the enclosure, a rockshaft mounted outside and above the tunnel enclosure, feeler means attached to said rockshaft and adapted to depend within the interior of the tunnel enclosure and to be located therein with the lower portion in the path of the articles as they pass into the tunnel enclosure and approach and recede from the spraying position, means located outside the tunnel enclosure operable by the rockshaft for controlling the spraying means so that spraying is caused to take place whenever and so long as an article inside the tunnel enclosure is in contact with the feeler means and is caused to be discontinued whenever the feeler means is out of contact with an article, a displaceable closure means for the approach end of the enclosure, a part of reduced height at the exit end of the enclosure and a closure means of sufficient length at the exit end of the enclosure which is adapted to assume a substantially horizontal position as the articles pass through the portion of reduced height so as to cover at least a portion of two of the said articles and ride thereover as they leave the tunnel enclosure thereby serving to minimise the escape of fat vapour into the atmosphere as the articles leave the tunnel enclosure.

ARTHUR FOSTER.

REFERENCES CITED

The following references are of record in the file of this patent:

UNITED STATES PATENTS

| Number | Name | Date |
|---|---|---|
| 1,862,380 | Larson | June 7, 1932 |
| 1,885,453 | Larson | Nov. 1, 1932 |